US009054744B2

(12) United States Patent
Reinhardt

(10) Patent No.: US 9,054,744 B2
(45) Date of Patent: Jun. 9, 2015

(54) CONTROL OF A DIGITAL RADIO FREQUENCY INTERFACE

(75) Inventor: Steffen Reinhardt, Nürnberg (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 575 days.

(21) Appl. No.: 13/142,440

(22) PCT Filed: Dec. 16, 2009

(86) PCT No.: PCT/EP2009/067275
§ 371 (c)(1),
(2), (4) Date: Aug. 15, 2011

(87) PCT Pub. No.: WO2010/076216
PCT Pub. Date: Jul. 8, 2010

(65) Prior Publication Data
US 2011/0286547 A1    Nov. 24, 2011

(30) Foreign Application Priority Data

Dec. 29, 2008 (EP) .................................. 08022478

(51) Int. Cl.
*H04L 27/00* (2006.01)
*H04B 1/00* (2006.01)
*H04B 1/40* (2006.01)

(52) U.S. Cl.
CPC ................ *H04B 1/0003* (2013.01); *H04B 1/40* (2013.01)

(58) Field of Classification Search
USPC ......................................................... 375/295
See application file for complete search history.

(56) References Cited

U.S. PATENT DOCUMENTS 7,400,596 B1 * 7/2008 Robertson et al. ............ 370/312
(Continued)

FOREIGN PATENT DOCUMENTS

JP    2009105881 A    5/2009
WO    2006102922 A1    10/2006

OTHER PUBLICATIONS

Fogg, A: "DigRF Baseband/RF Digital Interface Specification", internet citation, [online] xp00235710 retrieved From the internet: url:HTTP://146.101.169.51/dIGrf%20sTANDARD%20V112.PDF> [retrieved on Feb. 20, 2004] whole document.
(Continued)

*Primary Examiner* — Michael Neff
(74) *Attorney, Agent, or Firm* — Coats and Bennett, PLLC

(57) ABSTRACT

A control entity (100) for a communication device (110) and for communicating in accordance with a Digital Radio Frequency interface using a sequence of layers including a physical layer (102), a protocol layer (104) and a programming model layer (106), the control entity (100) comprising an interface control unit (108) implementing an interface control sub layer of the programming model layer (106) and adapted for controlling the protocol layer (104) and the physical layer (106), and a configuration interface (112) communicatively coupled to the interface control unit (108) and adapted for enabling an operator to configure a timing of control commands for controlling the control entity (100).

21 Claims, 4 Drawing Sheets

(56) References Cited

U.S. PATENT DOCUMENTS

| | | | |
|---|---|---|---|
| 2006/0223455 A1* | 10/2006 | Kerth | 455/76 |
| 2006/0239337 A1 | 10/2006 | Green et al. | |
| 2007/0087734 A1* | 4/2007 | Hinterberger et al. | 455/418 |
| 2008/0175207 A1* | 7/2008 | Lee et al. | 370/337 |
| 2008/0240211 A1 | 10/2008 | Green et al. | |
| 2008/0287079 A1 | 11/2008 | Matsui et al. | |
| 2009/0061787 A1 | 3/2009 | Koller et al. | |

OTHER PUBLICATIONS

Mobile Industry Processor Interface, "MIPI Alliance Specification for Dual Mode 2.5G/3G Baseband/RFIC Interface", MIPI Alliance Specification for DigRF 3G, Apr. 1, 2008, pp. 1-50, Version 3.09.04.

Mobile Industry Processor Interface, "Draft MIPI Alliance Specification DigRF v.4", MIPI Alliance Specification for DigRF v.4, Jun. 17, 2008, pp. 1-266, Version 00.01.23.

\* cited by examiner

CONTROL OF A DIGITAL RADIO FREQUENCY INTERFACE

TECHNICAL FIELD

The invention relates to a control entity for a communication device. Moreover, the invention relates to a communication device. The invention also relates to a control method. Beyond this, the invention relates to a program element and to a computer-readable medium.

BACKGROUND

The DigRF (Digital Radio Frequency) interface is a digital serial interface, which replaces the analog interface in previous generation mobile handset architectures supporting a variety of 3GPP air standards. A common standard for interfacing is the DigRF standard specified by the Mobile Industry Processor Interface (MIPI) Alliance. A current form of this standard is version v3.09. A new release of the DigRF standard—in the following also being referred to as called DigRF v4—is under specification (see mipi.org).

The physical layer of the DigRF connects an RF-IC (radio frequency integrated circuit) and a BB-IC (base band integrated circuit) with a seven wire interface. Independent transmit (Tx) and receive (Rx) differential signal pairs allow for concurrent bi-directional communication between a RF-IC and a BB-IC. In telecommunications in particular, it is often the case that those parts of the signal which are at low frequencies are converted up to higher frequencies for transmission purposes, since it may be difficult for communications media to pass low frequencies due to attenuation behaviour. The original, low frequency components, may be referred to as the baseband signal. Typically, the new, high-frequency copy is referred to as the RF or radio frequency signal. Again referring to DigRF, signals may be provided as the timing references for digital serial data transmission and recovery. The DigRF standard defines two basic packet types. Control packets are typically generated by the BB-IC for the purpose of configuring the RF-IC. Control packets are also utilized to communicate status between the RF-IC and the BB-IC. Digital input/output data is transferred between the RF-IC and the BB-IC in DigRF data packets.

Conventionally, DigRF technology may lack sufficient flexibility for a user.

SUMMARY

It is an object of the invention to provide a Digital Radio Frequency (Dig RF) system providing sufficient flexibility for a user.

In order to achieve the object defined above, a control entity for a communication device, a communication device, a control method, a program element, and a computer-readable medium according to the independent claims are provided.

According to an exemplary embodiment of the invention, a control entity for a communication device and for communicating in accordance with a Digital Radio Frequency (DigRF) interface using a sequence of layers including a physical layer, a protocol layer and a programming model layer is provided, the control entity comprising an interface control unit implemented in the programming model layer and adapted for controlling the protocol layer and the physical layer, and a configuration interface (such as a user interface) communicatively coupled to the interface control unit and adapted for enabling an operator to configure a timing of control commands for controlling the control entity.

According to another exemplary embodiment of the invention, a communication device for communicating in accordance with a Digital Radio Frequency interface is provided, the communication device comprising a control entity having the above mentioned features, and a further control entity communicatively coupled to the control entity.

According to still another exemplary embodiment of the invention, a method of controlling communication of a control entity (for a communication device) in accordance with a Digital Radio Frequency interface using a sequence of layers including a physical layer, a protocol layer and a programming model layer is provided, wherein the method comprises controlling the protocol layer and the physical layer of the control entity by an interface control unit implemented in the programming model layer of the control entity, and enabling an operator to configure a timing of control commands for controlling the control entity via a configuration interface of the control entity communicatively coupled to the interface control unit.

According to still another exemplary embodiment of the invention, a program element (for instance a software routine, in source code or in executable code) is provided, which, when being executed by a processor (such as a microprocessor or a CPU), is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor (such as a microprocessor or a CPU), is adapted to control or carry out a method having the above mentioned features.

Data processing which may be performed according to embodiments of the invention can be realized by a computer program that is by software, or by using one or more special electronic optimization circuits, that is in hardware, or in hybrid form, that is by means of software components and hardware components.

In the context of this application, the term "communication device" may particularly denote a transmitter device, a receiver device or a transmitter/receiver device (transceiver) which allows for a unidirectional or bidirectional exchange of communication messages with a communication partner. Such a communication device may particularly be a wireless communication device, i.e. a communication device which communicates without the necessity of wires. However, wire-based communication is also possible in other embodiments.

The term "control entity" may particularly denote a hardware, software or hybrid entity controlling a part of the operation of the communication device such as a mobile phone. In an embodiment, such a control entity may be a base band integrated circuit. Such a control entity may be configured as an electronic chip (such as an ASIC, Application Specific Integrated Circuit) or as a conventionally wired circuit.

The term "layer" may particularly denote different logic processes which may be arranged as different hierarchic levels in a control entity. Higher layers may relate to more sophisticated control purposes in contrast to lower layers which may be closer related to a physical transmission of data. In DigRF standards, a plurality of layers may be provided, wherein physical layer, protocol layer and programming model layer can be mentioned explicitly here. However, additional layers are possible, particularly above the programming model layer. Each layer may perform certain dedicated tasks to manage information between a sender and a receiver.

The term "timing" may particularly denote a chronological ordering scheme according to which control commands are to be transmitted in the system over time. For each of the control commands, a specific point of time may be defined (for instance by a time stamp) at which time this control command is to be transmitted to a destination or is to be executed.

The term "interface control unit" may particularly denote a hardware or software entity, which implements an interface control sublayer of a programming layer. Such an interface control unit may serve as an interface for controlling communicatively connected layers and/or other communicatively connected entities.

According to an exemplary embodiment, an interface control unit of the programming model layer of a control entity may be configured in a user-specific manner via a specifically provided configuration interface. A user may define and input a configuration of the control entity via this configuration interface so that the control function of the interface control unit in the programming model layer can then be adapted in accordance with the user preferences. Particularly, a user may define a mode according to which different control commands are to be transmitted over time within the control entity and/or between the control entity and a communicatively coupled further control entity so that a flexible adjustment of the internal and/or external control function of the control entity is possible. Particularly, when a control entity of one manufacturer or according to one technology is to be combined with a further control entity of another manufacturer or according to another technology, compatibility between these two control entities may be achieved by correspondingly configuring the interface control unit in the programming model layer. By taking this measure, the interface between different control entities may be properly defined in a simple way under control of a human operator.

Exemplary embodiments of the invention may allow obtaining at least a part of the following advantages:
  simple and flexible control of interfacing;
  procedures and timings can be adapted in any desired user-defined manner;
  future standard changes can be tracked;
  interoperability between manufacturers of different components of a communication device may be simplified (for instance between BB ASIC vendors and RF ASIC vendors).

In the following, further exemplary embodiments of the control entity will be explained. However, these embodiments also apply to the communication device, to the method, to the program element and to the computer-readable medium.

The interface control unit of the control entity (for instance a base band chip of a mobile terminal) may be adapted for controlling a further control entity (for instance a radio frequency chip of the mobile terminal), particularly may be adapted for controlling an interface control unit of a further control entity (or any other layer thereof, for instance a protocol layer and/or a physical layer).

The interface control unit may use register based programming for controlling its own lower layers and Interface Control Logical Channel (ICLC) commands for controlling the peer's DigRF interface which is acting as slave.

In an embodiment, the control entity may be adapted as a base band integrated circuit (BB-IC), more particularly as a base band ASIC (BB-ASIC). In a mobile phone, a base band integrated circuit may function as a master for controlling a radio frequency integrated circuit (RF-IC) acting as a slave. A BB-IC and an RF-IC may be interconnected via an interface which is configurable according to an exemplary embodiment. The BB-IC can be provided for signal processing of a signal which has been pre-processed by the RF-IC. The RF-IC may perform analog-to-digital signal conversion of an incoming signal (for instance an audio signal in a mobile phone application) and may further convert this signal into a base band signal for provision and further processing by the BB-IC.

In an embodiment, the control entity is adapted for communicating in accordance with a Digital Radio Frequency protocol version 3 (3.x with, e.g. with x=09) (DigRF v3) or version 4 as discussed above, or any other version. Regarding Version 4 (DigRF v4), such a system may or may not be included into a protocol as defined by the MIPI Alliance standard for DigRF v4. It is clear that any other version of this protocol or of another protocol may be used. A preferred embodiment relates to a DigRF v4 implementation, another embodiment can adapt the same principle for a DigRF v3 implementation (in such a DigRF v3 implementation, an interface control sub-layer should then be specified).

The interface control unit may be implemented (partially or completely) in hardware. In contrast to this, the configuration interface may be implemented (partially or completely) in software. The configuration of the configuration interface in software allows a user to flexibly adjust the control entity for cooperation with a further control entity by simply modifying the program code related to the software. This allows a user to flexibly combine different components with one another, as desired particularly in the field of mobile communication technology.

The configuration interface (of a control entity such as a BB-IC) allows a user to get access to the interface control unit and may be adapted for enabling an operator (such as a user or a system developer) to configure a timing mode of control commands for controlling a further control entity (such as an RF-IC) communicatively coupled to the control entity. The control entity may be communicatively coupled with a further control entity of the mobile phone. An interface between control entity and further control entity may then be flexibly configured by the interface control unit in combination with the configuration interface. Results of such a configuration can then be used to control (for instance by using time stamps) the timing of control commands exchanged between the control entity and the further control entity. For instance, BB-IC and RF-IC may be connected to one another through an Interface Control Logical Channel (ICLC) via which a message can be sent in a way as defined by the control entity, using the configured timing.

The configuration interface may be adapted for enabling an operator to configure the control entity for cooperation with a radio frequency integrated circuit. Thus, a user which may be an operator or a manufacturer of a BB-IC may configure the interface between BB-IC and an RF-IC in a way that any desired RF-IC (regardless of manufacturer or technology used therein) can cooperate functionally with the BB-IC. Hence, interoperability between different chip technologies may be made possible.

In an embodiment, the configuration interface may be adapted for enabling an operator to provide in advance a sequence of control commands with assigned time stamps indicative of a time at which a corresponding control command is to be executed. A time stamp may be denoted as a time-related value in a defined format which assigns an event to a point of time. Such an event may for instance be the transmission of a message, or the execution of a command. In an embodiment, a sequence of messages to be transmitted via an interface between BB-IC and RF-IC and/or within BB-IC or RF-IC can be defined in time by defining specific time stamps in combination with assigned control commands. Thus, the configuration may define any desired process which shall be carried out in a timely ordered manner. A user may therefore design any desired procedure with any desired sequence of commands for configuring the interface between BB-IC and RF-IC.

More particularly, the interface control unit may have a first input interface (which may be a unidirectional interface or a bidirectional interface) for receiving the sequence of control commands with assigned time stamps from the configuration interface. The interface control unit may have a second input interface (which may be a unidirectional interface or a bidirectional interface) for receiving data indicative of a present system time (such as an absolute time value, for instance a system counter, particularly an LTE (Long-Term Evolution) system counter). Moreover, the interface control unit may have an output interface (which may be a unidirectional interface or a bidirectional interface) for activating one of the control commands when a corresponding time stamp equals to the present system time. For instance, a comparator within the interface control unit may compare a time stamp as received via the first input interface with the present system time as received via the second input interface. If a comparator computes that there is no difference between a present system time and a time stamp, the corresponding control command is executed. Such a simple logic may allow for an efficient way to work off or process the various control commands.

The output interface may be coupled with at least one of a physical layer, a protocol layer and a programming model layer of a further control entity. Thus, via one or more of these layers, a harmonization of operation of control entity and further control entity is possible.

In an embodiment, the interface control unit is located in the BB-IC. The BB-IC may function as the master of the DigRF Interface. It is not foreseen to switch master functionality between peers. In such an embodiment, the RF-IC interface control sublayer will only receive commands and executes them and accesses thereby the protocol and physical layer. In addition, the RF-IC interface control sublayer can acknowledge commands, but it can never trigger changes by itself.

Next, further exemplary embodiments of the communication device will be explained. However, these embodiments also apply to the control entity, to the method, to the program element and to the computer-readable medium.

The control entity may be adapted as a base band integrated circuit (BB-IC) and the further control entity may be adapted as a radio frequency integrated circuit (RF-IC). Thus, the communication device such as a mobile phone may combine these two basic chips of a mobile phone which can be combined in a flexible manner with one another according to exemplary embodiments. The latter is possible since a user can coordinate operation of these two integrated circuits by correspondingly configuring the software interface.

The further control entity may use a sequence of layers including a physical layer, a protocol layer and a programming model layer, wherein an interface control unit implemented in the programming model layer of the further control entity may be communicatively coupled with the interface control unit of the control entity. Therefore, corresponding layers of control entity and further control entity may cooperate. For instance, the protocol layers may be communicatively coupled to one another, the physical layers may be communicatively coupled to one another, the interface control units implemented in the programming model layers may be communicatively coupled, and the programming model layers may be communicatively coupled. Each layer of a stack may be connected to a peer's layer. The Interface control sublayer communicates with the peer's interface control sublayer via interface control logical channel messages using lower layers, but the lower layer communication do not care about the content.

More particularly, the interface control unit of the further control entity may be adapted for, upon receiving a control message from the interface control unit of the control entity, controlling the physical layer and the protocol layer of the further control entity in accordance with control command received by the control message. In such architecture, the interface control unit of the control entity controls lower layers in the control unit as well as a corresponding layer of the further control entity. The further control entity, in turn, may control lower layers of the further control unit. This has turned out as an efficient control path.

Hence, in an embodiment, the control entity may be adapted as a master and the further control entity may be adapted as a slave. With such a master/slave architecture, configuration of the control entity may also have an effect on configuration on the further control entity. Since the further control entity may also serve a slave, it may also be denoted as a controlled entity. A BB-IC acting as the master of the entire interface may control its own physical layer (PHY) and protocol layer as well as the peer's physical layer (PHY) and protocol layer.

The communication device may further comprise a transmitter unit adapted for transmitting a communication message to a communication partner device and may comprise a receiver unit adapted for receiving a communication message from a communication partner device. The transmission unit may be a transmission antenna. The receiver unit may be a receiver antenna. It is also possible that transmitter antenna and receiver antenna are combined to a single common transceiver antenna.

The communication device may be adapted for wireless communication or wired communication. More particularly, the communication device may be adapted for wireless communication with a communication partner device. For example, communication between two mobile phones is possible, or communication between a mobile phone and a base station.

Exemplary embodiments of the invention relate to a mobile communication device, a portable communication device (i.e. a communication device which can be carried by a user during normal operation), a mobile terminal, a mobile phone, a data card, a Personal Digital Assistant (PDA), a telecommunications device, or a laptop. Any communication device may be used according to exemplary embodiments, although particular advantages may be obtained in the field of telecommunication, more particularly of cellular phones.

The communication device may be adapted for communicating with a communication partner device in accordance with a Long-Term Evolution (LTE) protocol, a WiMax protocol, or a Universal Mobile Telecommunications System (UMTS) protocol. However, other protocols may be implemented as well.

Exemplary embodiments provide a procedure allowing to achieve compatibility between different kinds of BB-ICs and RF-ICs, allowing to handle different kind of timings. Therefore, it is possible to use very different kinds of RF-ICs with a configurable BB-IC. In this configurable BB-IC it may be sufficient that the hardware component is maintained the same, whereas only the software has to be adapted.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

DETAILED DESCRIPTION

Figure 1:
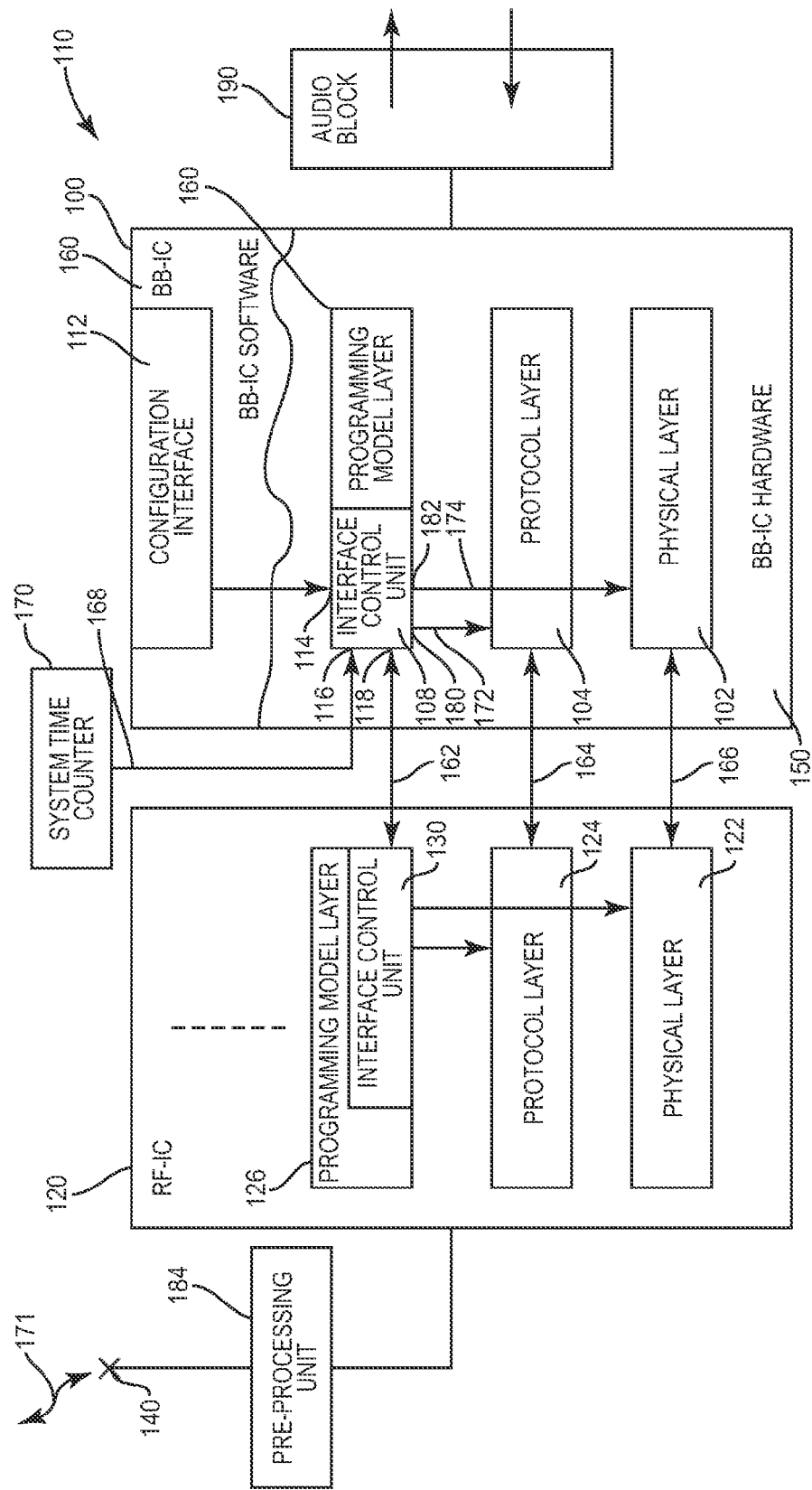
FIG. 1 illustrates a communication device according to an exemplary embodiment.

The illustration in the drawing is schematically. In different drawings, similar or identical elements are provided with the same reference signs.

In the following, referring to FIG. 1, a mobile phone 110 as a communication device according to an exemplary embodiment will be explained.

The mobile phone 110 comprises a BB-IC (Base Band Integrated Circuit) as a control entity 100. However, the BB-IC 100 may fulfil other tasks than only a control task. The BB-IC 100 is capable of communicating with an RF-IC (Radio Frequency Integrated Circuit) as a further control entity 120 using a Digital Radio Frequency (DigRF) interface constituted by a sequence of layers, as can be taken from FIG. 1.

The DigRF Interface comprises a physical layer 102, a protocol layer 104 logically above the physical layer 102, a programming model layer 106 logically above the protocol layer 104 and optionally further layers which are not shown in the figure. The programming model layer 106 of the DigRF interface further comprises an interface control sub layer implemented in the interface control unit 108 adapted for controlling the protocol layer 104 and the physical layer 102.

A configuration interface 112 is provided communicatively coupled to the interface control unit 108 and is adapted for enabling a user to configure the cooperating BB-IC 100 and RF-IC 120, particularly to configure a sequence of control commands each executed at a predefined time instance for controlling DigRF protocol layer 104 and physical layer 102 and/or the RF-IC DigRF Interface 120. As can be taken from FIG. 1, the BB-IC 100 is divided into a hardware portion 150 (including, inter alia, the interface control unit 108) and a software portion 160 (including the configuration interface 112).

In view of the architecture shown in FIG. 1, a user is able to configure the communication device 100 via the configuration interface 112 by correspondingly programming the software thereof in order to define a timing of control commands to be transmitted internally within the BB-IC 100 as well as between the BB-IC 100 and the RF-IC 120. Each of the control commands has a specific content, i.e. defines a command to be executed, and has a time stamp, i.e. an indication of a point of time at which a corresponding control command is to be executed. This allows the interface control unit 108 to control layers 102, 104 via communication channels 172, 174. Furthermore, an interface 162 between the interface control unit 108 and an interface control unit 130 of a programming model layer 126 of the RF-IC 120 can be adjusted accordingly. There is also a communication via a channel 164 between protocol layer 104 of BB-IC 100 and protocol layer 124 of RF-IC 120, and a communication channel 166 between physical layer 102 of BB-IC 100 and physical layer 122 of RF-IC 120.

A comparator (not shown) of the interface control unit 108 continuously compares a system time as provided via a communication channel 168 from a system time counter 170 with the corresponding time stamps assigned to the various control commands. If an absolute time defined by the system timer 170 corresponds to a time stamp assigned to a control command, this control command is carried out and consequently a communication message may be sent via a dedicated one of the communication channels 162, 172 or 174. The triggering of other messages is possible as well when system time and a time stamp equal.

More precisely, the interface control unit 108 has a first input interface 114 for receiving the sequence of control commands with assigned time stamps from the configuration interface 112, has a second input interface 116 for receiving the system time via the communication channel 168 from the system time counter 170, and has output interfaces 118, 180, 182 for forwarding one of the control commands when a corresponding time stamp equals to the present system time.

During operation of the mobile phone 110, a wireless transmission of electromagnetic radiation 171 takes place between a communication partner device (such as another mobile phone or a base station, not shown) and a transceiver antenna 140 of the mobile phone 110. When the receiver antenna 140 has received an electromagnetic radiation signal 171, it is supplied to a pre-processing unit 184 and subsequently to the RF-IC 120 for analog-to-digital conversion and for base band transformation. The processed signal may then be supplied to the BB-IC 100 for further signal processing. The processed signals may then be reproduced using a loudspeaker or the like included in an audio block 190. The audio block 190 may further acquire audio data (such as speech of a user of the mobile phone 110) via a microphone or the like. Such audio data may then be processed and transmitted via the transceiver antenna 140 as electromagnetic radiation 171 towards a communication partner device (not shown).

The system of FIG. 1 may, for example, be operated as a DigRF v4 interface control system.

Terminals for modern generation telecommunication systems that are based on Radio Access technologies like LTE (Long-Term-Evolution) or WiMax may use digital interfaces between a Radio Frequency Application Specific Integrated Circuit (RF-ASIC) and a Base Band Application Specific Integrated Circuit (BB-ASIC). This interface may transport the user data as well as all required control information from BB-ASIC to RF-ASIC or from RF-ASIC to BB-ASIC. It may be desired that such an interface comprises only a few lines, is robust against interference, emits itself as less interference as possible and consumes only low power.

A common standard for interfacing is the DigRF standard specified by the Mobile Industry Processor Interface (MIPI) Alliance. As discussed above, a present form of this standard is version v3.09. A corresponding interface is based on a serial high speed transmission over differential lines. Due to the fact that the gross data rate of this version of the standard is limited to 312 Mbit/s, it is not capable for 3.9G standards. Therefore, a new release of the DigRF standard—called DigRF v4—is under specification (see mipi.org). This standard is also based on high-speed serial transmission over differential lines, whereas in contrast to other high-speed standards the transmission is organized in normally quite short burst.

The DigRF v4 interface is divided in multiple layers. The lowest layer is the physical layer—in the following simply called PHY—that is based on M-PHY, which is also standardized by the MIPI alliance and reused for several standards. It defines the analog electrical characteristics for the high speed serial transmission as well as an 8b10b coding stage for simplifying clock data recovery (CDR). The next layer is the DigRF protocol layer which provides several logical channels towards the next higher layer. A logical channel may be used to transmit messages with a payload up to 256 byte or more, which are mapped to frames and concatenated to bursts by the protocol layer. The protocol layer respectively the protocol layer extension cares additionally about error protection, error detection and error handling.

The next higher layer—called DigRF programming model—cares about how to use the logical channel and gives more abstract requirements how to handle the data and control flow between BB-ASIC and RF-ASIC. This layer may promote interoperability between different vendors.

DigRF v4 offers much more features and flexibility in terms of different speeds, variable termination modes, variable length of synchronization sequence, etc. as well as better reliability in terms of bit error rate compared to DigRF v3.

This causes on the other side an increased complexity of the interface itself in comparison to DigRF v3 and an increased effort in controlling and monitoring the interface. To provide also enough data rate for multiple-input multiple-output (MIMO) systems, the standard supports several parallel differential lines, which operate in parallel and which can be switched on/off dynamically.

In the following, referring to FIG. 2, a layer concept for a communication between an BB-ASIC 100 and an RF-ASIC 120 will be explained.

Figure 2:
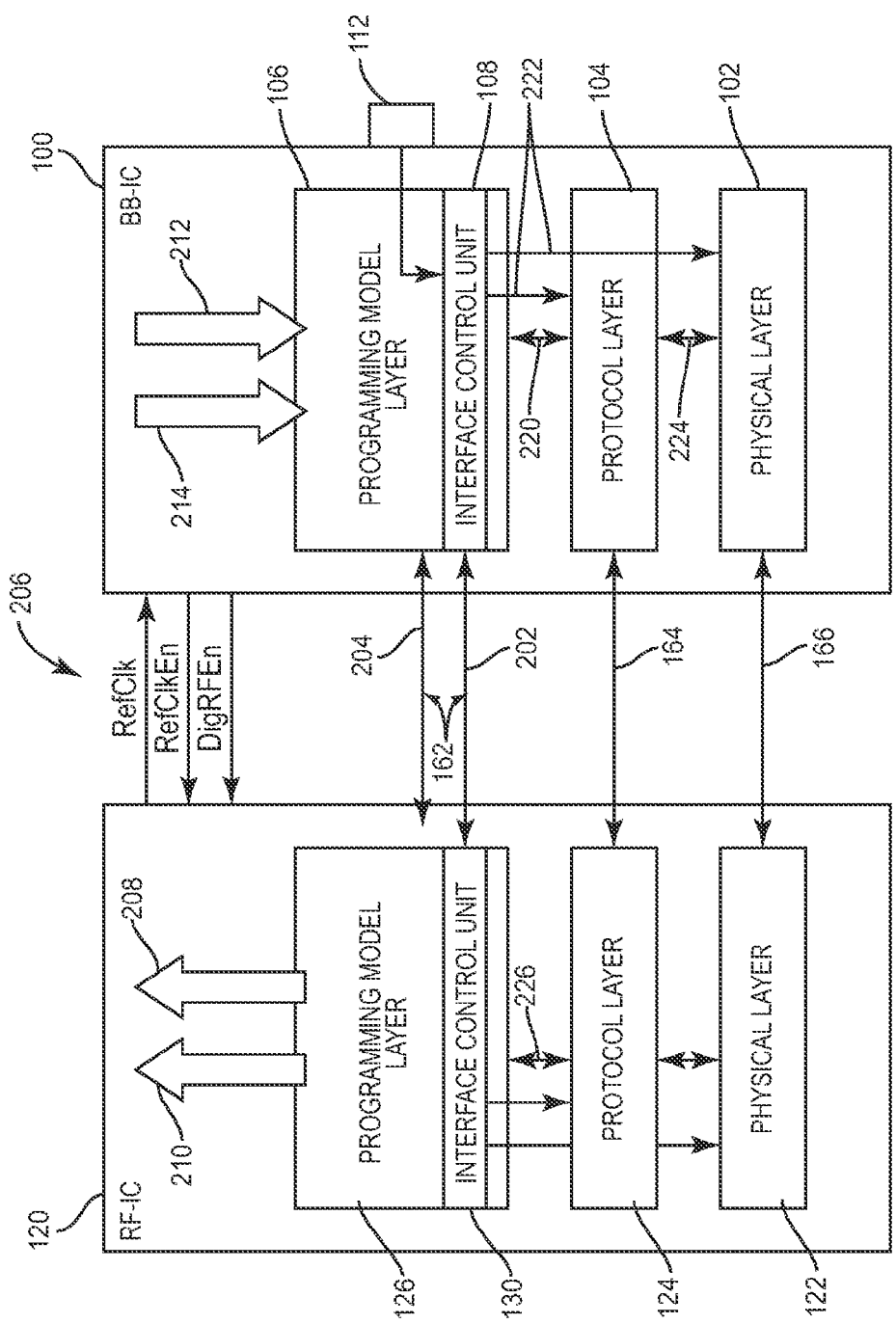
FIG. 2 illustrates a general layer concept with an interface control sub layer implementable according to an exemplary embodiment.

As can be taken from FIG. 2, the communication between the physical layers 102 and 122 is performed via the communication channel 166 via which one or more high-speed serial data links may be provided. Via the communication channel 164 communicatively coupling the protocol layers 104, 124, frames aggregated to bursts may be transferred. The communication channel 162 includes a first sub-channel 202 transmitting messages over ICLC (Interface Control Logical Channels), as well as a channel 204 related to messages over logical channels.

Furthermore, various other data messages can be transmitted via additional channels 206 between the BB-ASIC 100 and the RF-ASIC 120. Data signals 208 and RF-ASIC control signals 210 are supplied to higher layers (not shown in FIG. 2) of the RF-ASIC 120. In a similar way, data 212 as well as RF-ASIC control data 214 may be supplied to the programming model layer 106 of the BB-ASIC 100. Communication between the layers 108 and 104 is possible as well as communication between the layers 108 and 102, wherein logical channels 220 are provided as well as configuration channels 222. An eight bit stream may be exchanged between the layers 102, 104 which is denoted with reference numeral 224. Moreover, configuration data 226 may be exchanged between layers 126 and 124.

FIG. 2 illustrates the layer concept of the DigRF standard with the interface control sub-layer 108 that is part of the programming model 106. The interface control sub-layer 108 takes care of the configuration of the protocol layer 104 and the physical layer 102 at the side of the BB-ASIC 100 (similar processes may take place at the side of the RF-ASIC 120).

Both peers of the interface start in a specified and known default configuration. In the following all configuration changes are initiated by the BB-ASIC 100. The base band side informs the RF-ASIC 120 about a configuration change through a message send via the interface control logical channel (ICLC) 202 and changes then its own DigRF protocol and PHY configuration. The programming model 126 on the RF-ASIC 120 side takes care to change the protocol layer 124 or the physical layer 122 settings on RF-ASIC 120 side. To avoid errors, certain procedures and timing requirements have to be fulfilled, which may be implementation dependent.

Additionally there are some dedicated lines 206, namely a RefClkEn signal which enables the system clock delivered by the RF-ASIC 120 and a DigRFEn signal which enables the DigRF on the RF-ASIC 120 side itself. This line can also be used to reset the RF-ASIC 120 DigRF in case of fatal errors.

The provision of the configuration interface 112 according to an exemplary embodiment of the invention for configuring the interface control unit 108 by a user allows a user in a simple way to adopt the communicating entities 100, 120 in accordance with user preferences, for instance to achieve compatibility between the RF-ASIC 120 and the BB-ASIC 100. Exemplary embodiments may configure a DigRF system for high-data rate systems like LTE or WiMax.

In an embodiment, a highly flexible control mechanism is provided. This control mechanism is in charge of controlling the protocol layer 104 and the physical layer 102 via register based programming as well as the DigRF peer in the RF-ASIC 120 over the interface control logical channel (ICLC) 202. This control mechanism is capable to restrain timing requirements and procedures given by the standard or by the IP itself and may be adjustable.

An embodiment provides a programmable and flexible hardware mechanism that can control the BB-ASIC DigRF and RF-ASIC DigRF in a way that arbitrary procedures and timings can be realized by software programming. This is realized with time stamps assigned to each interface control message. The message is executed if the time stamp is equal to the LTE system counter.

Due to the high speed of the interface main parts of the DigRF, it may be advantageous to realize especially the physical layer 102 and the protocol layer 104 in hardware. Also the controlling of the interface should rely on accurate timing and procedures, what makes the implementation in hardware advantageous. Also the interface control sub-layer 108 can be implemented in hardware.

Figure 3:
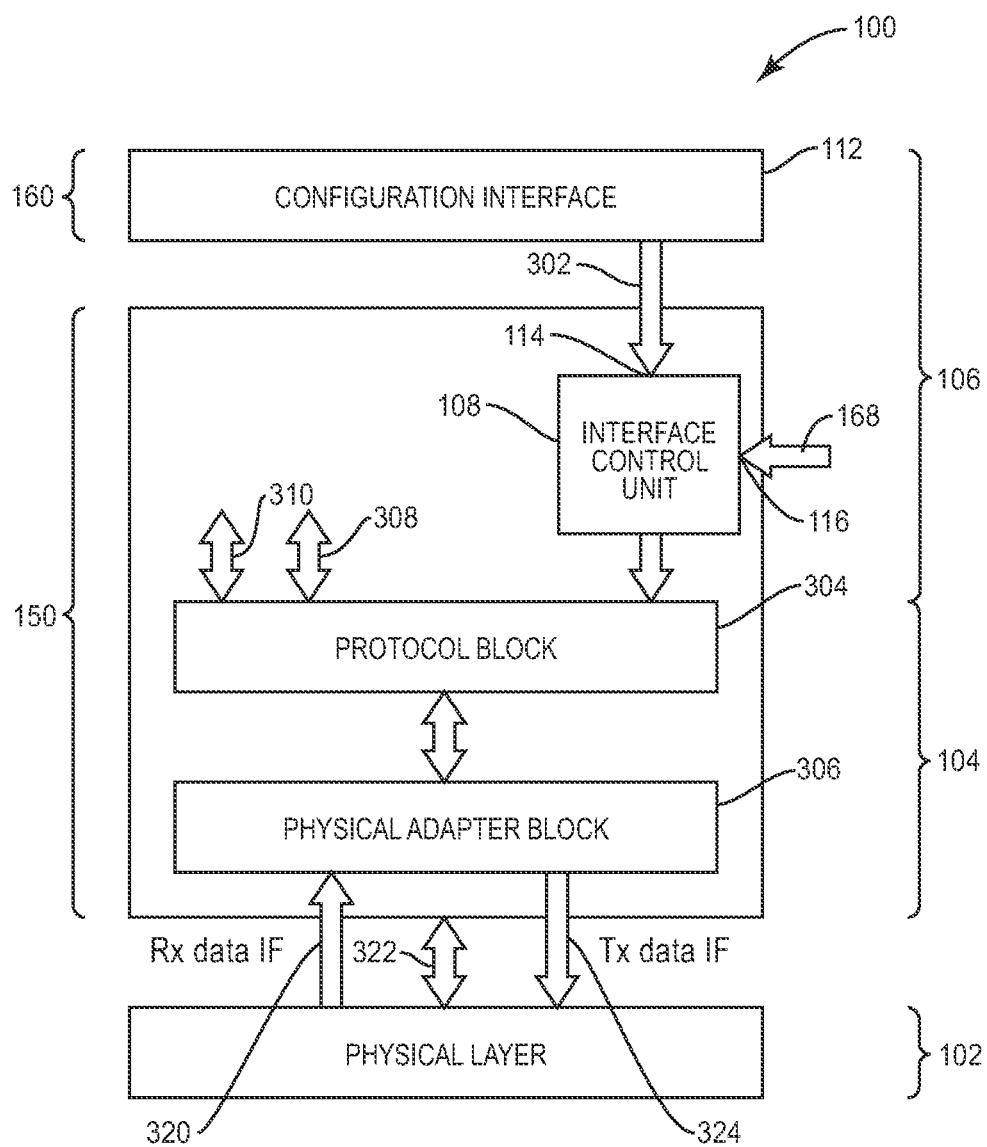
FIG. 3 illustrates a block diagram and a hardware/software split according to an exemplary embodiment.

Due to these reasons, a hardware/software split as depicted in FIG. 3 may be performed according to exemplary embodiments. FIG. 3 shows a more detailed layer model for the BB-IC 100 shown in FIG. 1 according to an exemplary embodiment of the invention.

Via a communication channel 302 between the configuration interface 112 and the interface control unit 108, a service access point (SAP) to software link is provided. The protocol layer 104 comprises a protocol block 304 and a physical adapter block 306 communicatively coupled with the protocol block 304. The protocol block 304 can transmit and receive control flow messages 308 and data flow messages 310. Furthermore, receiver data may be transmitted between units 102 and 306 via communication channel 320, control data may be exchanged via a communication channel 322 and transmission data may be exchanged via communication channel 324.

The interface control unit 108 comprises an interface control command (ICC) queue as well as a logic to analyze and execute commands. Each ICC may comprise a header and a payload as described in chapter 6 in DRAFT MIPI Alliance Standard for DigRF version 4; compare http://www.mipi.org.

Figure 4:
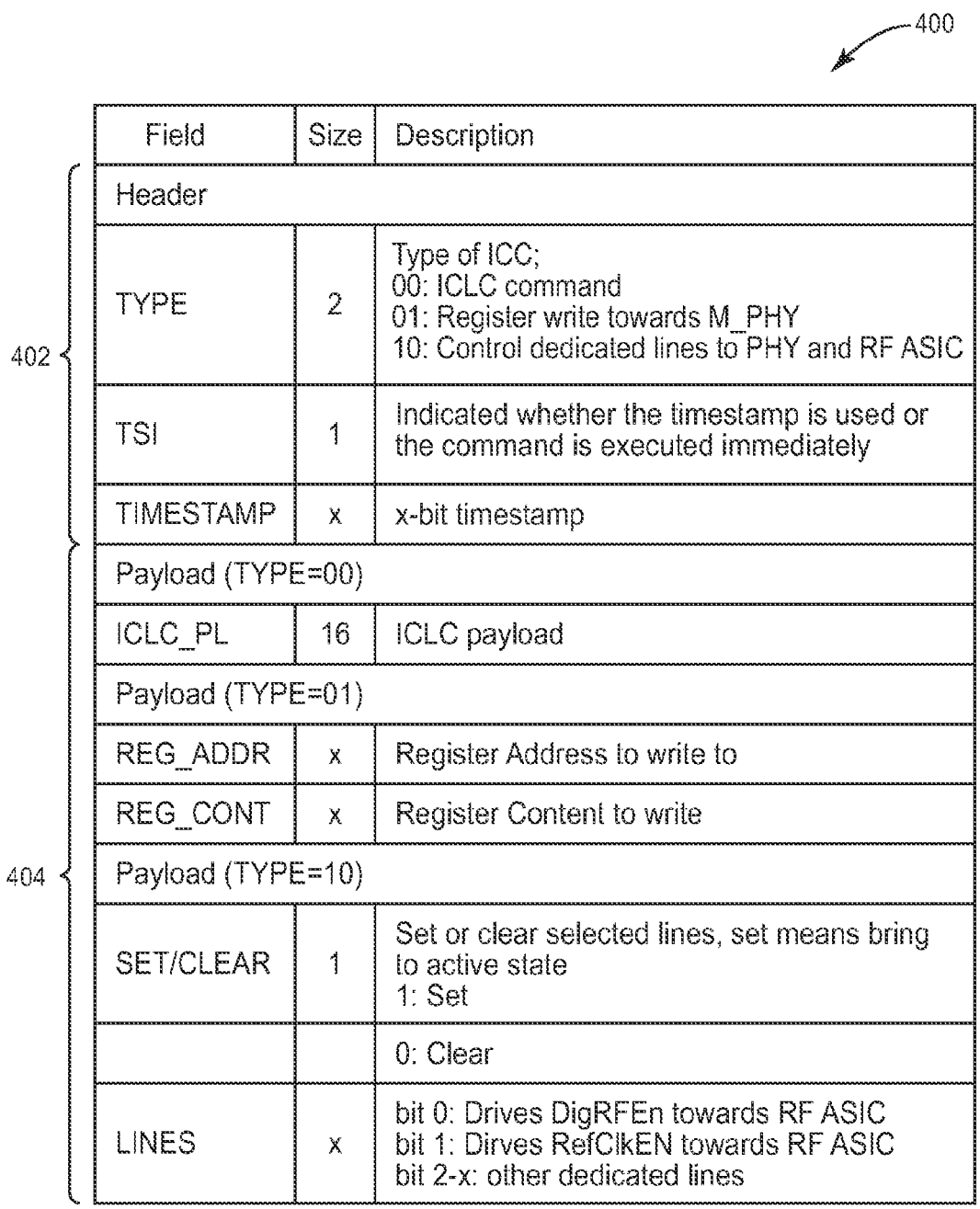
FIG. 4 illustrates a communication message including a header and a payload communicated according to an exemplary embodiment.

FIG. 4 schematically illustrates constitution of an ICLC message 400 transmitted via a communication channel 202 as shown in FIG. 2. The size of the individual components of the ICIC message 400 is given in bits.

Such a communication message 400 comprises a header 402 including control data and a payload 404 including use data. In the header 402, the type of the ICC is first defined by a variable TYPE. As can be taken from FIG. 4, the content of the payload 404 depends on the value of the variable TYPE. The header 402 further comprises a component TSI which can have a logical value "1" so that the system will know that there is a time stamp (compare variable TIMESTAMP) to be compared with the system time, and only if the two times are in accordance to one another, the command is executed. If TSI is at a logical value "0", the corresponding message is carried out immediately.

The bit field TYPE included in the header 402 indicates whether a register writes towards the BB DigRF Physical Layer 102, an ICLC command is sent towards RF-ASIC 120 or dedicated lines towards the RF-ASIC 120 are set/reset. The next bit TSI determines whether the time stamp is used or the command is sent immediately. If the time stamp is used, the value of TIME-STAMP is compared to the timing value delivered by the LTE System counter 170 or an internal counter. If both values are equal, the command is executed.

With this mechanism arbitrary delays between commands can be realized and a given procedure of commands can be programmed or preconfigured. Also phases where the DigRF is in sleep mode can be preconfigured.

The protocol layer 104 on BB-ASIC 100 side may be also configured via ICLC commands. The protocol layer 104 analyzes the ICLC commands, sends the ICLC command to RF-ASIC 120 and executes the required configuration changes after receiving an acknowledgement ACK for the ICLC command. The user may account for delays caused by retransmissions of ICLC commands.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A control entity for a communication device and for communicating in accordance with a Digital Radio Frequency interface using a sequence of layers, including a physical layer, a protocol layer, and a programming model layer, wherein the control entity is a base band integrated circuit, the control entity comprising:
an interface control circuit configured to implement an interface control sub layer of the programming model layer, to control the protocol layer and the physical layer; and
a configuration interface communicatively coupled to the interface control circuit and configured to enable a human operator to configure a timing of control commands, the timing of the control commands comprising time stamps, each time stamp indicative of a time at which a corresponding control command is to be executed, wherein at least some of the control commands control the control entity.

2. The control entity according to claim 1, wherein at least some of the control commands control a further control entity communicatively coupled to the control entity.

3. The control entity according to claim 2, wherein the further control entity is a radio frequency integrated circuit.

4. The control entity according to claim 1, wherein the control commands are included in a sequence of control commands, wherein the configuration interface is configured to assign time stamps to the control commands in that sequence as designed by the human operator.

5. The control entity according to claim 4, wherein the interface control circuit has a first input interface for receiving the sequence of control commands with assigned time stamps from the configuration interface, has a second input interface for receiving a present system time, and is configured to output a control command from an output interface when the time stamp assigned to that control command equals the present system time.

6. The control entity according to claim 5, wherein the output interface is coupled with at least one of a physical layer, a protocol layer and a programming model layer of a further control entity.

7. The control entity according to claim 1, wherein at least one of:
the configuration interface is programmable by the human operator to configure the timing of the control commands;
the interface control circuit is configured to control a further control entity;
the control entity is configured to communicate in accordance with Digital Radio Frequency interface Version 4;
the interface control circuit is implemented in hardware;
the configuration interface is implemented in software; and
the configuration interface is configured to configure the control entity, as set by the human operator, for cooperation with a radio frequency integrated circuit.

8. The control entity of claim 1, wherein the configuration interface is configured to enable a human operator to configure a chronological order in which control commands are to be transmitted to a destination or to be executed.

9. The control entity of claim 1, wherein the configuration interface is configured to enable a human operator to configure the times at which the control commands are executed or transmitted relative to a present system time.

10. A communication device comprising:
a control entity for communicating in accordance with a Digital Radio Frequency interface using a sequence of layers, including a physical layer, a protocol layer, and a programming model layer, the control entity comprising:
an interface control circuit configured to implement an interface control sub layer of the programming model layer, to control the protocol layer and the physical layer; and
a configuration interface communicatively coupled to the interface control circuit and configured to enable a human operator to configure a timing of control commands, the timing of the control commands comprising time stamps, each time stamp indicative of a time at which a corresponding control command is to be executed, wherein at least some of the control commands control the control entity; and
a further control entity communicatively coupled to the control entity, wherein the control entity is a base band integrated circuit and the further control entity is a radio frequency integrated circuit.

11. The communication device according to claim 10, wherein the further control entity uses a sequence of layers including a physical layer, a protocol layer and a programming model layer, wherein an interface control circuit implemented in the programming model layer of the further control entity is communicatively coupled with the interface control circuit of the control entity.

12. The communication device according to claim 11, wherein the interface control circuit of the further control entity is configured, when controlled by the interface control circuit of the control entity, to correspondingly control the physical layer and the protocol layer of the further control entity.

13. The communication device according to claim 10, wherein at least one of:
- the control entity is configured as a master and the further control entity is configured as a slave;
- the communication device comprises a transmitter unit configured to transmit a communication message to a communication partner device and also comprises a receiver unit configured to receive a communication message from a communication partner device;
- the communication device is configured for at least one of wireless communication and wired communication;
- the communication device comprises at least one of a mobile communication device, a portable communication device, a mobile terminal, a mobile phone, a data card, a Personal Digital Assistant, a telecommunications device, and a laptop;
- the communication device is configured for communicating in accordance with at least one of a Long-Term Evolution protocol, a WiMax protocol, and a Universal Mobile Telecommunications System protocol;
- the further control entity is configured to convert a received analog Radio Frequency (RF) signal into a digital base band signal, and the control entity is configured to perform signal processing with the digital base band signal.

14. A method of controlling communication of a control entity, for a communication device, in accordance with a Digital Radio Frequency interface using a sequence of layers, including a physical layer, a protocol layer, and a programming model layer, wherein the control entity is a base band integrated circuit, the method comprising:
- controlling the protocol layer and the physical layer of the control entity by an interface control circuit implementing an interface control sub layer of the programming model layer of the control entity; and
- enabling a human operator to configure a timing of control commands via a configuration interface of the control entity communicatively coupled to the interface control circuit, wherein the timing of the control commands comprises time stamps, each time stamp indicative of a time at which a corresponding control command is to be executed, and wherein at least some of the control commands control the control entity.

15. The method according to claim 14, wherein at least some of the control commands control a further control entity communicatively coupled to the control entity.

16. The method according to claim 15, wherein the further control entity is a radio frequency integrated circuit.

17. The method according to claim 14, wherein the control commands are included in a sequence of control commands, and wherein the method comprises assigning time stamps to the control commands in that sequence as designed by the human operator, via the configuration interface.

18. The method according to claim 17, further comprising:
- receiving the sequence of control commands with assigned time stamps from the configuration interface at a first input interface of the interface control circuit;
- receiving a present system time at a second input interface of the interface control circuit; and
- outputting a control command from an output interface of the interface control circuit when the time stamp assigned to that control command equals the present system time.

19. The method according to claim 18, wherein the output interface is coupled with at least one of a physical layer, a protocol layer and a programming model layer of a further control entity.

20. The method according to claim 14, wherein at least one of:
- the configuration interface is programmable by the human operator to configure the timing of the control commands;
- the interface control circuit is configured to control a further control entity;
- the control entity is configured to communicate in accordance with Digital Radio Frequency interface Version 4;
- the interface control circuit is implemented in hardware;
- the configuration interface is implemented in software; and
- the configuration interface is configured to configure the control entity, as set by the human operator, for cooperation with a radio frequency integrated circuit.

21. A computer program product stored on a non-transitory computer-readable medium, and comprising a computer program that, when executed by a processor associated with a control entity for a communication device, causes the control entity to control communication of the communication device in accordance with a Digital Radio Frequency interface using a sequence of layers, including a physical layer, a protocol layer, and a programming model layer, wherein the control entity is a base band integrated circuit, the computer program causing the control entity to:
- control the protocol layer and the physical layer of the control entity by an interface control circuit implementing an interface control sub layer of the programming model layer of the control entity; and
- enable a human operator to configure a timing of control commands via a configuration interface of the control entity communicatively coupled to the interface control circuit, wherein the timing of the control commands comprises time stamps, each time stamp indicative of a time at which a corresponding control command is to be executed, wherein at least some of the control commands control the control entity.

* * * * *